(12) United States Patent
Kadaba

(10) Patent No.: US 6,539,360 B1
(45) Date of Patent: Mar. 25, 2003

(54) SPECIAL HANDLING PROCESSING IN A PACKAGE TRANSPORTATION SYSTEM

(75) Inventor: Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/245,557

(22) Filed: Feb. 5, 1999

(51) Int. Cl.⁷ .............................................. G06F 15/20

(52) U.S. Cl. ............................ 705/28; 705/22; 700/215

(58) Field of Search ........................................ 705/28, 22

(56) References Cited

U.S. PATENT DOCUMENTS

| | | |
|---|---|---|
| 3,290,491 A | 12/1966 | Wahlberg |
| 3,645,391 A | 2/1972 | Hirakawa et al. |
| 3,652,795 A | 3/1972 | Wolf et al. |
| 3,908,113 A | 9/1975 | Maxham et al. |
| 4,024,380 A | 5/1977 | Gunn |
| 4,058,217 A | 11/1977 | Vaughan et al. |
| D249,345 S | 9/1978 | Oliveira et al. |
| 4,340,810 A | 7/1982 | Glass |
| 4,471,218 A | 9/1984 | Culp |
| 4,511,970 A | 4/1985 | Okano et al. |
| 4,588,881 A | 5/1986 | Pejas et al. |
| 4,621,189 A | 11/1986 | Kumar et al. |
| 4,629,871 A | 12/1986 | Scribner et al. |
| 4,651,150 A | 3/1987 | Katz et al. |
| 4,656,591 A * | 4/1987 | Goldberg ..................... 705/28 |

(List continued on next page.)

FOREIGN PATENT DOCUMENTS

| | | |
|---|---|---|
| CA | 1000386 | 11/1976 |
| EP | 0 565 290 A2 | 10/1993 |
| WO | WO 89/04016 | 5/1989 |
| WO | WO 99/34272 | 7/1999 |

OTHER PUBLICATIONS

Hiroo Kawata, "Information Technology of Commercial Vehicles in the Japanese Parcel Service Business," *Proceedings of the 1992 International Congress on Transportation Electronics*, 1992, pp. 372–382; Society of Automotive Engineers, Warrendale, PA, USA.

Henry Towle, "On the Fast Track with TotalTrack: UPS Deploys Mobile Data Service," *Document Delivery World*, Apr./May 1993, pp. 30–31; USA.

(Press Release) U.S. Patent Office To Issue Broad Patent On International E–Commerce System, Edward Pool, DE Technologies, Jun. 6, 2000.

Irving, F. Midrange Systems, v5, n14, p7, Jul. 21, 1992.*

MaxiTrack® Manual Version 2.8, pp. 3–1–3–11; 4–1–4–25; 5–1–5–11; 6–1–6–11; 8–1–8–23; 9–1–9–3.

MaxiShip User Manual Version 3.13, Section 2–1 to 2–51.

*How to Use UPS Consignee Billing With Service Explanation*, UPS Consignee Billing.

*Service Update*, UPS GroundSaver®.

Primary Examiner—Gregory A. Morse
(74) Attorney, Agent, or Firm—Alston & Bird LLP

(57) ABSTRACT

The application discloses a method and system for processing packages designated for special handling and notifying an appropriate party as to whether special handling has been applied to these designated packages. The system prepares carrier personnel in advance for the arrival of such packages. Detailed package information for a current day's shipments is sent electronically from a consignor to the carrier, which sorts the information and makes it available to carrier personnel at package handling centers where special handling will be verified or applied. Notification of the status of the packages is transmitted to the consignor by e-mail, pager, or posting on a secure web site. Resolution of exceptions is expedited by the accessibility of information as provided by the system. Carrier management can readily monitor the operation of the system both in real time and historically.

36 Claims, 3 Drawing Sheets

U.S. PATENT DOCUMENTS

| | | |
|---|---|---|
| 4,677,552 A | 6/1987 | Sibley, Jr. |
| 4,796,180 A | 1/1989 | Riley |
| 4,799,156 A | 1/1989 | Shavit et al. |
| 4,825,053 A | 4/1989 | Caille |
| 4,832,204 A | 5/1989 | Handy et al. |
| 4,836,352 A | 6/1989 | Tateno et al. |
| 4,839,813 A | 6/1989 | Hills et al. |
| 4,859,839 A | 8/1989 | Teleman et al. |
| 4,900,905 A | 2/1990 | Pusic |
| 4,901,241 A | 2/1990 | Schneck |
| 4,923,022 A | 5/1990 | Hsieh |
| 4,940,887 A | 7/1990 | Shen-Jung |
| 4,941,091 A | 7/1990 | Breault et al. |
| 4,947,333 A | 8/1990 | Sansone et al. |
| 4,951,196 A | 8/1990 | Jackson |
| 4,975,841 A | 12/1990 | Kehnemuyi et al. |
| 4,992,649 A | 2/1991 | Mampe et al. |
| 4,998,204 A | 3/1991 | Sansone et al. |
| 4,999,481 A | 3/1991 | Baer et al. |
| 5,031,223 A | 7/1991 | Rosenbaum et al. |
| 5,038,283 A | 8/1991 | Caveney |
| 5,043,908 A | 8/1991 | Manduley et al. |
| 5,050,207 A | 9/1991 | Hitchcock |
| 5,068,797 A | 11/1991 | Sansone et al. |
| 5,070,463 A | 12/1991 | Schuricht et al. |
| 5,072,400 A | 12/1991 | Manduley |
| 5,072,401 A | 12/1991 | Sansone et al. |
| 5,077,694 A | 12/1991 | Sansone et al. |
| 5,079,714 A | 1/1992 | Manduley et al. |
| 5,146,403 A | 9/1992 | Goodman |
| 5,153,842 A | 10/1992 | Dlugos, Sr. et al. |
| 5,168,444 A | 12/1992 | Cukor et al. |
| 5,195,130 A | 3/1993 | Weiss et al. |
| 5,198,644 A | 3/1993 | Pfeiffer et al. |
| 5,216,620 A | 6/1993 | Sansone |
| 5,220,501 A | 6/1993 | Lawlor et al. |
| 5,245,535 A | 9/1993 | Weiss et al. |
| 5,249,687 A | 10/1993 | Rosenbaum et al. |
| 5,260,867 A | 11/1993 | Maeser et al. |
| 5,262,939 A | 11/1993 | Vanpouchke |
| 5,274,547 A | 12/1993 | Zoffel et al. |
| 5,313,051 A | 5/1994 | Brigida et al. |
| 5,319,562 A | 6/1994 | Whitehouse |
| 5,341,505 A | 8/1994 | Whitehouse |
| 5,602,742 A | 2/1997 | Solondz et al. |
| 5,631,827 A | 5/1997 | Nicholls et al. |
| 5,656,799 A | 8/1997 | Ramsden et al. |
| 5,657,378 A | 8/1997 | Haddock et al. |
| 5,770,841 A | 6/1998 | Moed et al. |
| 5,787,400 A | 7/1998 | Weber |
| 5,804,802 A * | 9/1998 | Card et al. .................. 235/375 |
| 5,831,220 A | 11/1998 | Ramsden et al. |
| 5,869,819 A | 2/1999 | Knowles et al. |
| 5,880,451 A | 3/1999 | Smith et al. |
| 6,012,065 A | 1/2000 | Boucher et al. |
| 6,018,725 A | 1/2000 | Boucher et al. |
| 6,078,889 A | 1/2000 | Boucher et al. |
| 6,094,642 A * | 7/2000 | Stephenson et al. .......... 705/28 |

* cited by examiner

SPECIAL HANDLING PROCESSING IN A PACKAGE TRANSPORTATION SYSTEM

TECHNICAL FIELD

The present invention relates generally to the shipping of packages, and more particularly to a method and system for processing packages designated for special handling and notifying an appropriate party as to whether special handling has been applied to these designated packages.

BACKGROUND OF THE INVENTION

Shipping carriers, such as United Parcel Service, maintain computerized shipping records for the purposes of tracking packages. Typically, a customer obtains tracking information by calling and requesting such information from a customer service representative or by directly accessing the package delivery company's web site via the Internet. A customer may be either a consignor or a consignee. The "consignor" is the customer sending a package by a shipping carrier. The "consignee" is the recipient of that package. Though the consignor and consignee can obtain tracking information, they cannot obtain more detailed information about the package such as whether special handling has been applied.

The term "special handling" encompasses a variety of operations in which particular packages are identified and treated differently from routine packages in the shipping carrier's transportation system. Such special treatment may include, for example, holding a package for pickup at a designated point within the transportation system, transporting sensitive, hazardous or toxic substances in a special way, and other similar customer requests. The carrier may, for example, be requested to extract a package from the usual stream of packages and hold it at a particular location for very early morning pickup by a consignee. Or, the carrier may be asked to verify that a refrigerated container for biological material is functioning at various points along its route.

In the "hold for pickup" example, a manufacturer may have service representatives repairing equipment in many diverse locations, and these service representatives may often have an immediate need for repair parts from a central warehouse. If the manufacturer requests ordinary overnight delivery of the package containing a part, the service representative will not be able to use the repair part until late morning. When early morning delivery options are available, they may be too expensive for the manufacturer to use on a regular basis. Therefore, the manufacturer requests that the package be held at the carrier's consolidation point nearest to the job site for personal pickup by the service representative early in the morning. This procedure has the dual benefit of early receipt of the package and low cost, because the final delivery by small vehicle from the carrier's facility to the consignee is an expensive part of the package transportation process.

In the case of dangerous or sensitive contents, the integrity of a protective container throughout the package's journey may be critical to use of the contents by the consignee. For example, if a biological sample needed for experimental or medical use must be maintained at a low temperature continuously, the carrier may be requested to handle the package with extra care or to inspect the package at consolidation points along its route to assure continued viability. Checking a temperature gauge or other monitor associated with the container may be required. The carrier may need to check the integrity of protective packaging when the contents are dangerous or particularly fragile.

The consignee of a special handling package may go to great lengths to prepare for use of the package contents assuming that the package has received the requested special handling. Non-arrival or failure of protective or environmental containers may cause great inconvenience or expense on the part of the consignee. In the hold for pickup example, the service representative makes arrangements to arrive early at the consolidation point, and may also make special arrangements at the job site in anticipation of the timely arrival of the repair part, such as hiring special technicians or expensive special equipment. In the case of a biological sample for laboratory use, considerable time and expense may have been needed to assemble other materials and apparatus for use in a narrow window of time based on the anticipated safe delivery of the special handling package. If a medical or veterinary use is planned, the consignee may reserve facility and specialist time, and a patient will also arrange to be present. Current delivery practice gives the consignee no confirmation of package status between the time of acceptance by the carrier and receipt by the consignee.

Presently, carrier personnel responsible who must apply requested special handling to a package learn of the need for special handling only when they receive the package and examine its label. For example, personnel must identify and segregate a hold for pickup package or a package to be specially inspected "on the fly." This can make it difficult to provide the special handling consistently and in a timely manner. Also, consignees can ascertain whether special handling has been properly applied only upon receiving the package. As a result, in the event the package requires further special handling by the consignee, or in the event the special handling has not been properly applied, the consignee is not able to make (or cancel) special provisions for the use of the contents of the package in a timely manner prior to receiving the package. Thus, there is a need to alert carrier personnel in advance of their receipt of a package requiring special handling, and to provide a way for the consignee to check the status of special handling prior to receiving the package.

U.S. Pat. No. 5,038,283 describes a shipping method for facilitating the efficient distribution of goods. A container packing record identifying an individual container and its contents is transmitted to a programmable computer located at the container's shipping destination. As a container is received at the shipping destination, the shipping destination computer searches its database for the container's scanned bar code and corresponding packing record. The computer provides an output directing the container to an order packing area if items needed to fill customer orders are contained within the received container. The shipping destination computer also provides an output either confirming receipt of all of the previously shipped containers or listing the containers lost in shipment. Though U.S. Pat. No. 5,038,283 describes a shipping method for facilitating the efficient distribution of goods, it does not describe providing special handling status information to consignees.

U.S. Pat. No. 5,031,223 describes a knowledge-based processor that analyzes the aggregate volume of mail flowing through the postal system and transmits to each destination location inventory and resource allocation information necessary to plan for the equipment and personnel needed in the following days to sort and deliver the mail at each destination location. The knowledge-based processor transmits the inventory and resource allocation information to the destination location by electronic communications link. This information includes an indication that the mail piece is on its way and the routing information needed to automatically sort and deliver the mail piece to its corporate addressee. Though U.S. Pat. No. 5,031,223 provides routing information for internal use, it does not provide any of this information to customers.

U.S. Pat. No. 5,043,908 describes a self-monitoring delivery system that tracks mail as it passes through multiple delivery stages and creates a schedule of expected arrival times at each stage. Should a mail piece not arrive on time, the system is alerted to initiate a search for the late or missing mail piece, or to take other corrective action, such as expediting delivery of late pieces. This tracking information is for internal use only; a customer cannot check on the status of a mail piece en route. This system also does not provide for inspecting or verifying special handling, or compiling data on errors or discrepancies for future analysis of system performance.

U.S. Pat. No. 5,072,401 describes a system for interactive on-line electronic communications and processing of business transactions between a plurality of different types of independent users including freight service providers and their shipping customers. For example, freight service providers can auction freight services to users on the system's bulletin board, and users can subscribe to and confirm the freight services on-line from remote terminals. The system's bulletin board requires the consignor to specify details about the source, destination, and nature of the load. The system's bulletin board does not provide status information to customers regarding a packages already en route.

Based on the foregoing discussion, it will be apparent that there is a need for the service of inspecting special handling packages, verifying their status, and notifying a consignee of the special handling status of a consignor's packages at any of the package consolidation points so that the consignee has an opportunity to respond by preparing to receive the package or by taking corrective action before receiving a package that does arrive at the time or in the condition planned.

There is also a need in the art for providing advance notice of the arrival of a package requiring special handling to carrier personnel in a package transportation system.

Finally, there is also a need for a method and system for compiling data on package handling discrepancies or errors for analysis and subsequent improvement of system performance.

SUMMARY OF THE INVENTION

This invention seeks to provide a method and system for processing packages designated for special handling that prepares carrier personnel in advance for the arrival of such packages, and notifies a consignee of information relating to special handling of such packages.

In accordance with the invention, this object is accomplished in a shipping system wherein the consignor specifies packages that are to be afforded special handling while being shipped to various destinations. From these specifications, the shipping service provider compiles a list of the consignor's packages that require special handling. This list is then sorted by package consolidation points within the shipping system, such as shipping hubs or distribution centers. The consignor's packages are inspected at selected package consolidation points to identify those packages that have been designated for special handling. Personnel may verify whether the special handling has been properly applied. An example of special handling that my benefit from the present invention is holding a package for pickup by the consignee at a particular consolidation point in a package transporting system.

In addition, the consignee may be notified as to whether the special handling as been properly applied. The consignee can also access the shipping provider's computer system to check the status and location of the package designated for special handling.

The advantage of this invention is that the consignee can easily obtain the latest information on the status of packages designated for special handling and plan accordingly prior to receiving the package. Being able to readily obtain this information enables the consignee to respond appropriately. For example, a consignee may be notified to pick up a package that is being held for pick-up at a package consolidation point within the transportation. A consignee also may be notified of special transport requirements for receipt of a hazardous substance.

In another embodiment of the present invention, the system is monitored to ascertain whether special handling is being properly applied at the appropriate times. In this embodiment of the invention, an alert is generated when there is a recurring failure to apply special handling.

A special handling system according to the present invention provides the hardware and software needed for receiving package information from consignors, identifying certain packages requiring special handling, and transmitting information concerning the special handling of those packages to carrier personnel in advance of the arrival of the packages. This pre-alert or advance notice allows for planning so that personnel at consolidation points can readily identify special handling packages as they arrive, inspect them, verify whether special handling is needed or has been properly applied, and allocate resources generally to deal with incoming packages. Advance notice also can be given to the consignee.

DETAILED DESCRIPTION OF THE PREFERRED EMBODIMENT

Figure 1:
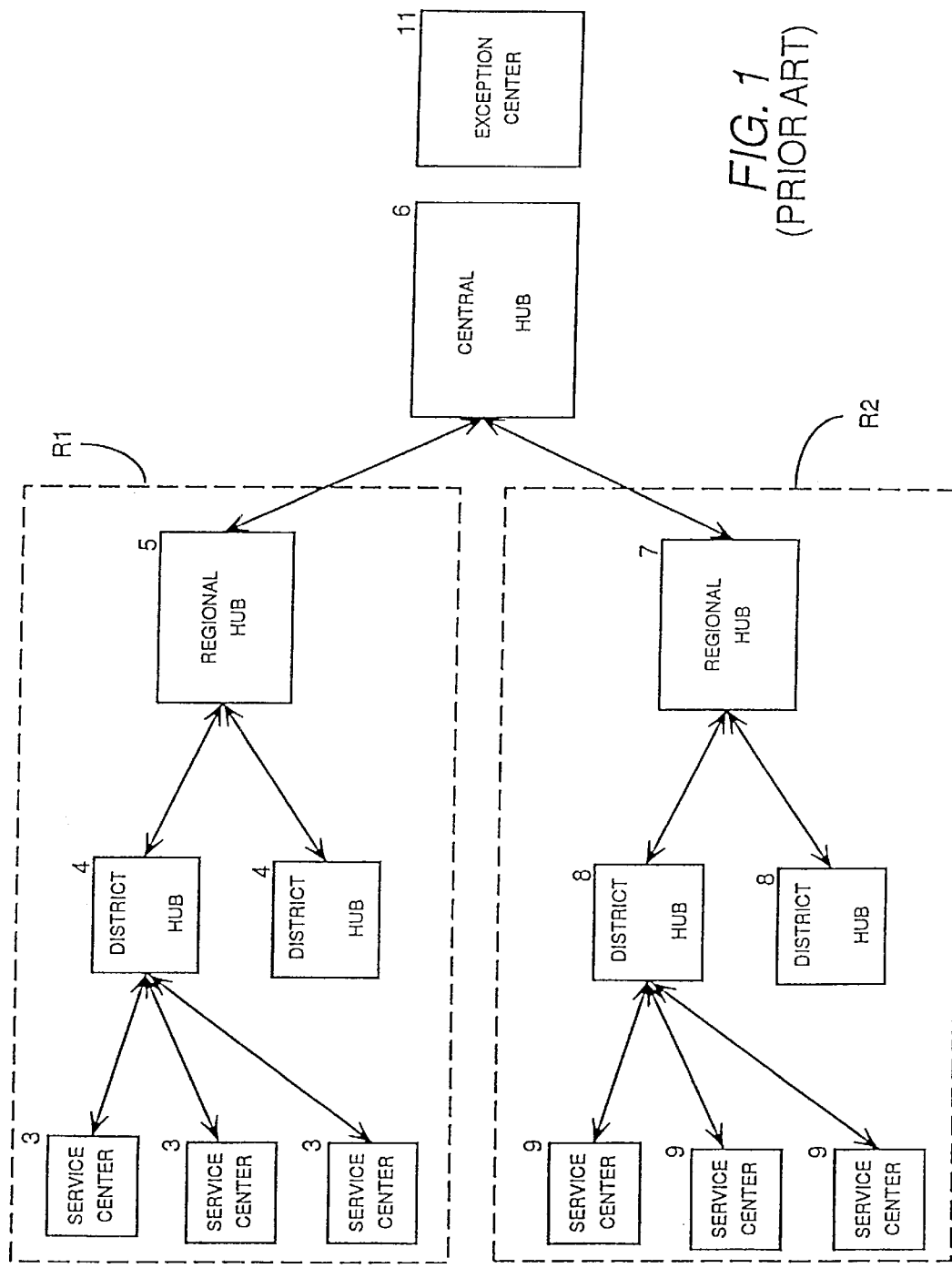
FIG. 1 is a diagram showing transit point relationships for movement of a package during shipping and handling within a transportation system as taught by the prior art.

The present invention provides a novel system and method for processing packages designated for special handling and notifying the appropriate party whether special handling has been applied to these designated packages. Generally described, the preferred embodiment of the present invention functions in a package carrier's transportation system 2 taught by prior art and shown in FIG. 1. U.S. Pat. No. 4,832,204 describes a package handling and sorting system with a hub and spoke configuration. The transportation system 2 incorporates a plurality of regions R which include a branching system of package handling and sorting facilities. FIG. 1, a partial illustration of such a transportation system 2, includes regions R1 and R2. Region R1 includes many service centers 3, which may be the origin point for a package entrusted to the carrier by a consignor, or the destination point for a package being delivered to a consignee. The carrier may use delivery vehicles to pick up packages and bring them to a service center, or to deliver packages from a service center to a consignee.

The service centers 3 are linked by transport (truck, rail or air) to a district hub 4. Packages going beyond the area served by the service center are transported to the district hub 4, all of which serve a group of service centers. The district hubs of region R1 sort and consolidate packages from two or more service centers 3 for transport either to a different service center for delivery, or to a regional hub 5. The regional hub 5 sorts and consolidates the packages from two or more district hubs 4 for transport either to a different district hub 4, or to a central hub 6 which sorts and consolidates the packages form two or more regional hubs 5 for transport to a different region associated with the package's destination. For example, the destination may be region R2. Alternatively, the packages may be shipped directly from one regional hub to another.

The central hub transports packages for destinations in region R2 to the regional hub 7. The regional hub 7 sorts and segregates such packages for transport to one of a plurality of district hubs 8 associated with the package's destination, where that sub-group of packages is again sorted and segregated for transport, each to one of a plurality of service centers 9 associated with the package's destination. Each package may then be sorted for each delivery route operating out of that service center, or held for pickup by the consignee. Of course, at the same time the service centers 9, district hubs 8, and the regional hub 7 are sorting and consolidating packages flowing in the other direction in the manner described above in connections with the service centers 3, district hubs 4, and the regional hub 5.

The carrier may also maintain an exception center 11 for the purpose of identifying and dealing with packages that cannot be normally processed through the transportation system 2. Exceptions, that is, errors and discrepancies in package handling, may arise because of weather delays, mis-sorting, inability to determine the destination address, lack of a required signature, or other problems. Personnel affiliated with the exceptions center attempt to solve such problems and facilitate package delivery despite exceptions, particularly when a source of recurring exceptions can be identified.

It will be understood that each service center, district hub, and regional hub, as well as the central hub, may be equipped with label scanning devices to acquire address information from package labels, and with automatic sorting equipment. Examples of such equipment that may be installed at these facilities are described in U.S. Pat. Nos. 5,388,681; 5,441,141; 5,489,017; 5,547,063; and 5,327,171. These facilities serve as package consolidation points where packages are sorted and segregated according to their-transit route and final destination. The district hubs and regional hubs may have facilities for receiving packages directly from consignors, or holding them for pickup by consignees.

Figure 2:
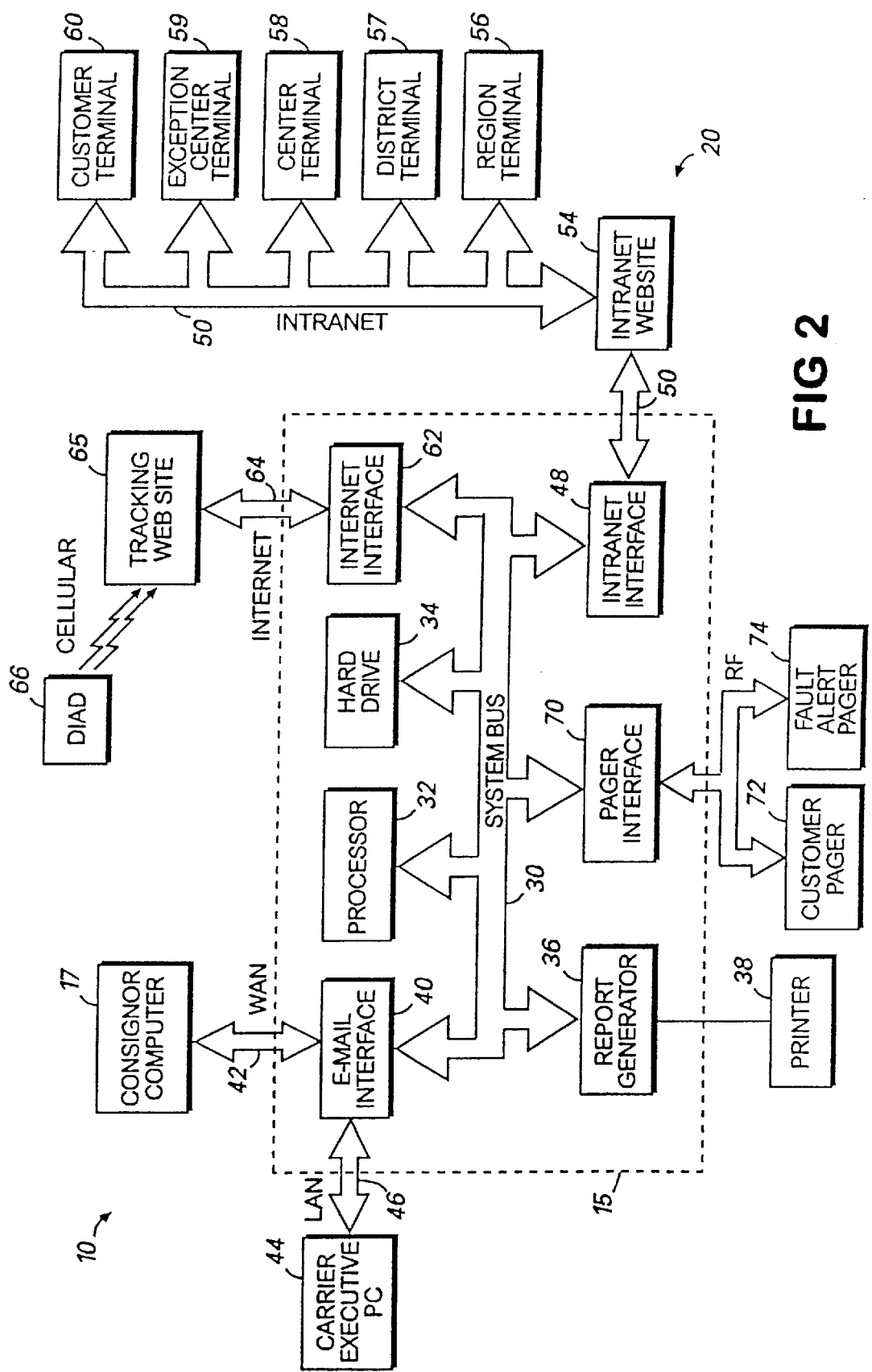
FIG. 2 is a diagram depicting the system architecture for an exemplary embodiment of the present invention.

FIG. 2 shows diagrammatically the system architecture for an exemplary embodiment of a special handling system 10 for a package transportation system according to the present invention. As described in detail below, the function of the special handling system 10 is to manage communication of data related to the actual handling and transport of packages using a carrier's central computer system 15 that is linked to a consignor's computer system 17 and an intranet system 20 operated by the carrier. The communications between these components are utilized to coordinate and manage special handling of designated packages, such as identifying, inspecting, and verifying special handling. Examples of special handling as described above include providing a hold for pickup service, providing extraordinary care in handling fragile or dangerous items, or inspecting special containers to verify their integrity.

The carrier central computer system 15 can be a mainframe computer, an appropriately configured personal computer, or a server within a network environment. The computer system 15 includes a number of components connected to a system bus 30 in a manner known in the art. These components include a CPU 32, a hard drive 34 for digital storage, a report generator 36, and several interfaces than include the hardware and software needed to communicate with devices outside the computer system 15.

An e-mail interface 40 is connected to the consignor computer 17 via a wide area network (WAN) 42 or the Internet, and to other computers within the carrier, such as an executive's PC 44, via a local area network (LAN) 46. Those skilled in the art will understand that many routing systems exist for e-mail, and any such system can be used in connection with the present invention.

An intranet interface 48 connects the central computer system 15 to an intranet 50 operated by the carrier. The intranet 50 includes an intranet web site 54 that can be accessed by the central computer and also by terminals or PC's as permitted by the carrier. These may include a regional terminal 56 at each regional hub 5, 7, a district terminal 57 at each district hub 4, 8, a central hub terminal 58, an exception center terminal 59, and a customer terminal 60. All of these terminals can access the intranet web site 54 to obtain package information uploaded from the central computer system 15, preferably using any Internet browser.

An Internet interface 62 connects the central computer 15 to the Internet, and particularly to a tracking web site 65 maintained by the carrier. The carrier may scan a tracking number on each package at the various points along the route of a package, and transmit the tracking number, along with the time and location of the scan, to the tracking web site 25. One example of a device for scanning package labels is a data acquisition device 66 used by a vehicle driver to log in packages when they are picked up from a consignor. The information may be transmitted to a computer system maintained by the carrier (not shown) by a cellular telephone connection, and then uploaded to the web site 65. Other sources of information updates for the web site 65 include scanners at the various consolidation points of the transportation system 2. Consignors and consignees with knowledge of the tracking number can obtain the status of the package by consulting the web site 65.

A pager interface 70 connects the central computer system 15 to pagers 72 carried by customers (consignors or consignees) and pagers 74 carried by carrier personal such as those associated with the exception center 11. Preferably, these pagers are alphanumeric pagers.

Thus, it will be seen that the special handling system 10 provides the hardware and software needed for receiving package information from consignors, identifying certain packages requiring special handling, and transmitting information concerning the special handling of those packages to carrier personnel in advance of the arrival of the packages. This pre-alert or advance notice allows for planning so that personnel at consolidation points can readily identify special handling packages as they arrive and can allocate resources generally to deal with incoming packages. Advance notice also can be given to the consignee.

Preferably, the package information received from the consignor contains a high level of detail, referred to herein as "package level detail" or PLD. PLD data includes the source address or postal code for the package, a reference or tracking number, the final destination address and postal code, the package weight, the level of service and rate applied to the package, the value of the contents, customer codes or description of the contents, hazardous material identification, special handling requirements, and other pertinent information related to the package. Any of these items of information can be transmitted to or made available to personnel at downstream consolidation points, to the consignor, and to the consignee.

Figure 3:
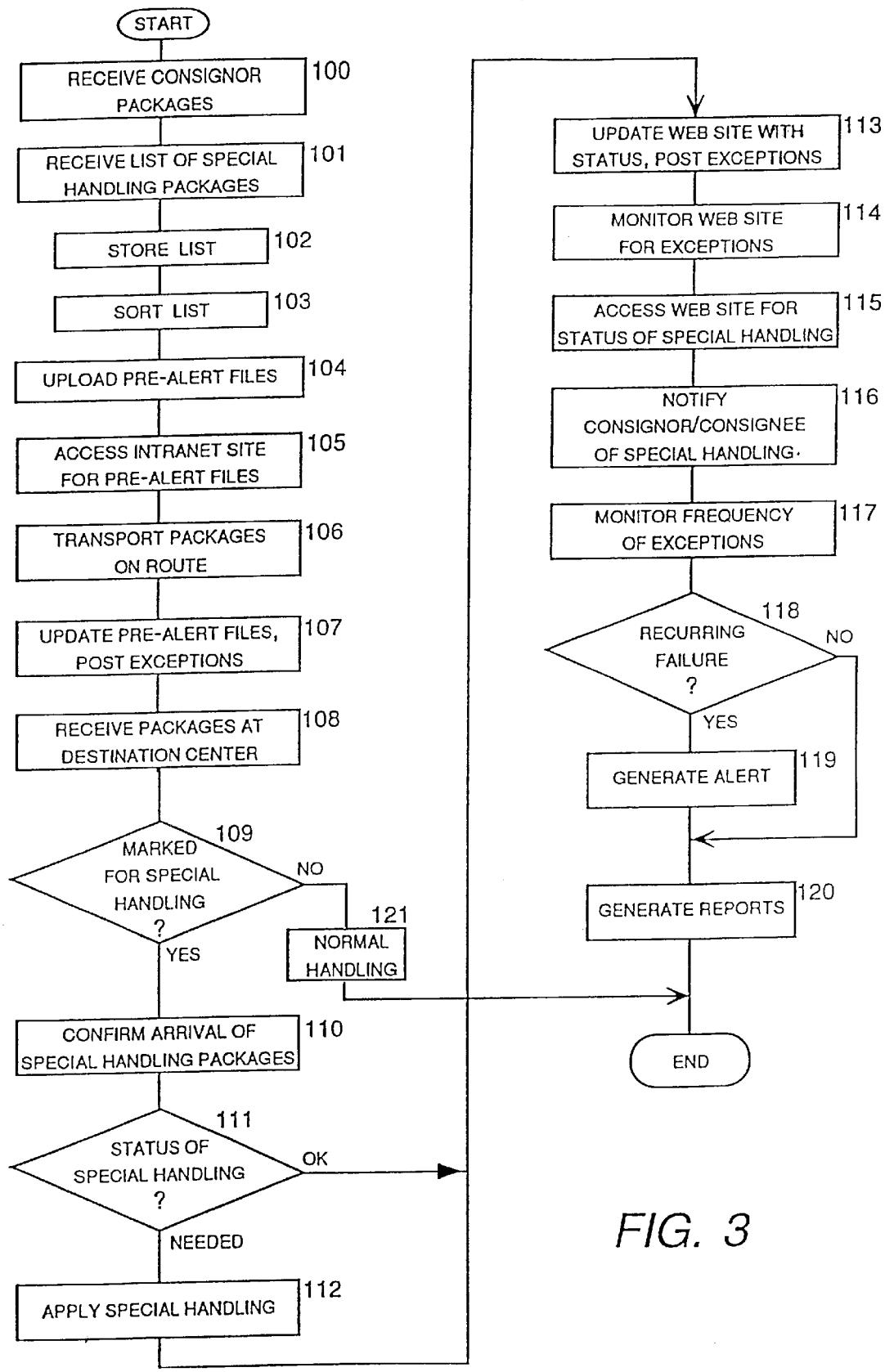
FIG. 3 is a flow diagram depicting steps performed by an exemplary embodiment of the present invention to provide status information regarding a package designated for special handling and to monitor whether special handling is being properly applied at the appropriate times.

FIG. 3 is a flow diagram depicting steps performed by an exemplary embodiment of the present invention to process packages designated by a consignor for special handling during shipment on a particular day. Examples of special handling would be holding a package for pickup and specially handling a biological sample, as described above.

At step 100, the carrier receives various packages from a consignor, some of which require special handling. They may be received, for example, from various consignor locations during the evening. At step 101, the computer 15 receives PLD information via e-mail from the consignor computer 17 for packages being shipped on that day. This information may originate from one or more consignor offices and may relate to packages to be picked up by the carrier at one or more locations. These e-mail messages may be received, for example, between 10:00 p.m. and midnight from various time zones. At step 102, the data is stored on the hard drive 34. At step 103, the PLD data received from each consignor is consolidated and sorted into region-specific files, each of which is sorted by district and destination postal code. These files are referred to herein as "pre-alert files." At step 104, the pre-alert files are uploaded via the intranet interface 48 to the intranet web site 54. This step preferably occurs by 1:00 am.

The pre-alert files contain information that facilitates processing of special handling packages according to the invention. For example, a pre-alert file for a hold for pickup package can include the time of shipment, the location at which the package should be held, the identity of the person who will pick up the package, the identity of the consignor, and the nature of the contents. A pre-alert file for a package containing sensitive biological samples can include similar information plus the nature of the inspection to be carried out and a condition, such as a temperature, that must be maintained during shipment.

At step 105, the pre-alert files may be accessed and downloaded to one or more of the regional terminals 56, the district terminals 57, and the center terminals 58. The downloaded pre-alert files allow the carrier personnel to know how many packages they should expect for particular types of special handling, and information to help identify each of the packages, such as the tracking number. There also may be information allowing the carrier personnel to prepare for applying special handling, such as providing a cooler or refrigerated vehicle for a biological sample.

The consignor or consignee may also be permitted access to determine whether the special handling has been applied. For example, the consignee can check to see if a package is on schedule, or if it has arrived and is being held for pickup at a particular location, or if it has been inspected as required. If an exception has occurred, the consignee may be given access to data on intranet site from which the consignee can determine that the plans for the shipment will have to be modified or canceled.

At step 106, during the early morning hours the carrier transports the packages along their routes toward destination centers. At step 107, the pre-alert files are updated as the packages are scanned whenever they are handled at a consolidation point. The arrival, presence, and departure or the package, as well as any noted exceptions, are posted to the Internet web site 65. An exception might be a failure to identify an expected package that was supposed to be held for pickup. Or, an exception might be a failure of a special container to maintain the temperature of a biological sample or to adequately protect a fragile or dangerous article. The central computer 15 updates the pre-alert files on the intranet web site 54 with information downloaded from the Internet site 65.

The carrier transports the packages through the transportation system shown in FIG. 1, as described above. In some cases, special handling is applied during the entire journey, for example, from a service center 3 to a district hub 4 to a regional hub 5, and on to a central hub 6, another regional hub 7, a district hub 8, or a service center 9. This would be true for the examples of a biological specimen or a fragile item. In other cases, special handling may be a one-time procedure, such as holding a package for pickup at a particular consolidation point, or detouring a package containing certain type of substance for a special customs inspection at an international border.

At step 108, the packages are received at their destination centers 3 or 9, typically between 2:00 and 5:00 am. At step 109, the incoming packages are inspected to find those that have been marked for special handling. This may be done manually or by scanning for the tracking numbers identified in the pre-alert files. At step 110 the center in question confirms the arrival of the special handling packages it has identified. If not all the expected special handling packages can be confirmed by a designated time, such as 5:00 am, an effort is made to find missing packages by 8:30 am. An exception pertaining to the package may be posted on the Internet site 65 or the intranet site 54. At step 111, a determination is made for each special handling package whether special handling has previously been applied or is now required. For those packages requiring special handling, the method goes to step 112, where the required special handling is applied. For example, personnel will take a package to be held at the center for pickup by a consignee, segregate it at a special customer service area, and hold it, check the status of a container, or re-route a package to customs, etc. The process then goes to step 113 for such packages. For packages to which special handling was previously applied, this is verified at step 111 and the process goes directly to step 113.

The center personnel update the status of the packages at step 113, either by directly uploading the information to the intranet web site 54, or by uploading the information to the carrier's main tracking system for posting to the Internet site 65. The pre-alert data may be supplemented with a scan made at the destination center, a scan made when the consignee receives the package, and any exception scans. Periodically, the central computer 15 updates the pre-alert files on the intranet web site 54 with information downloaded from the Internet site 65. The information for downloading is retrieved by sending the tracking numbers for the packages in question to the web site 65. At step 114, which may be carried out periodically throughout the shipment and handling of packages, the exception center 11 monitors the Internet web site 65 and the intranet web site 54 for exception postings.

During the day, as represented by step 115, the carrier's regions and districts can view the status of the packages using web browsers at terminals 56 and 57, respectively, for management review. Also, the consignor and/or consignee can utilize a customer terminal 60 to access the web sites to determine whether a package has received special handling and the actual time it occurred. For example, a consignee can determine whether a package is being held for pickup, or whether a biological sample has progressed to a consolidation point in a viable container. Furthermore, a consignor requesting hold for pickup by one of its employees at a particular service center can monitor the availability of the package at the hold for pickup location, and obtain the actual time the employee picked up the package. Additionally, at step 116 the carrier can notify the customer directly by e-mail, or by signal to the customer pager 72, when the package is available for pickup and when the employee has picked up the package. Thus, a consignee may discover whether the shipment will arrive when expected and in the condition expected in two ways, by checking the Internet or the intranet site, or by receiving a communication from the carrier.

At step 117, the exception center personnel monitor the web sites for exceptions relating to special handling, and at step 118, determine if there has been a recurring failure to apply requested special handling based on predefined standards. If so, an alert is generated at step 119 to initiate a problem solving effort by the exception center 11. The alert may be sent to appropriate carrier personnel by signal to the fault alert pager 74.

At step 120, the processor 32 analyzes the available data regarding the special handling processing for the last delivery day, or for various past periods of time. The resulting analyses are passed to the report generator 36, which prepares reports for the consignors and for carrier management. These reports may be printed on the printer 38, or they may be sent electronically via e-mail to the consignor computer 17 and the carrier executive's computer 44. Alternatively, they may be posted on secure Internet or intranet sites for access by authorized persons. It should be understood that all web site access herein requires an appropriate level of security provided in a manner known to those skilled in the art, such as password and personal identification number (PIN) control.

The internal carrier reports generated by the report generator 36 may include, for example, carrier analysis volume reports, reports on destination volume or performance, reports on volume or performance for particular carrier services, and reports on historical trends on such subjects. The consignor reports may combine the scan history of the package, who signed for the package, and when it was received, with the original PLD data.

If, at step 110, the inspected package does not require special handling, normal processing proceeds for the package, including sorting for transport on the route to its destination.

Those skilled in the art will understand that when the foregoing method involves a step of accessing or monitoring files or data on a web site, the terminals or PCs accessing the information using a browser may be configured to periodically poll the site and to display the result of the polling, eliminating the need for manual activity to access the sites to periodically check the status of packages. Furthermore, the accessing machine may be programmed to analyze the data received and to provide a visual or audible alert, an automatic e-mail message, or an automatic pager signal, if a matter needs attention.

Thus, the special handling procedures according to the present invention have many applications, including hold for pickup, and special procedures required for delivery of controlled pharmaceuticals, for temperature controlled materials, for hazardous materials, and for other special situations. Furthermore, the system and procedures disclosed can be used to improve logistics planning for normal packages, by providing carrier personnel with real time advance notice of the type and volume or packages that will need to be handled. This advance notice allows personnel at downstream locations to arrange needed resources, such as transport vehicles and adequate staffing.

The system and method of the present invention thus can be seen in the described embodiment to proceed by consolidating PLD information from a consignor, generating a sorted list by consolidation points in the transportation system at which special handling must be applied or verified, identifying and inspecting such packages when they arrive at such consolidation points, verifying the special handling status of the packages, applying special handling when needed, and notifying the consignee or the consignor or both of the status of the special handling packages.

While this invention has been described in detail with particular reference to preferred embodiments thereof, it will be understood that modifications and variations may be made without departing from the scope of the invention as defined in the appended claims.

What is claimed is:

1. A computer system for monitoring packages designated for special handling and being shipped to a plurality of consolidation points, comprising:
   a first computer with a processor configured to carry out instructions comprising the following steps:
      compiling a list of designated packages requiring special handling; and
      sending said list electronically to a central computer;
   an intranet linking said central computer, an accessible intranet site and a plurality of personal computers;
   said central computer including a processor configured to carry out instructions comprising the following steps:
      storing said list of designated packages requiring special handling;
      sorting said list by consolidation point; and
      posting sorted information from said list to said intranet site;
   a plurality of scanning devices positioned at said consolidation points linked to said intranet site;
   said personal computers being located at each consolidation point with processors configured to carry out instructions comprising the following steps:
      accessing said intranet site;
      downloading information identifying said designated packages for said consolidation points; and
      prior to sortation of packages at said consolidation points, identifying said designated packages responsive to one of said scanning devices detecting arrival of a designated package; and
   a second computer configured to receive input data indicating for each designated package whether special handling has been applied and to then process said input data.

2. The computer system as recited in claim 1, wherein said second computer is configured to carry out instructions comprising the following step:

processing said input data to determine how often there is a failure to apply special handling.

3. The computer system as recited in claim 2, wherein an alert signal is generated by said second computer when there is a recurring failure to apply special handling.

4. The computer system as recited in claim 2, wherein said first computer transmits said list to said central computer prior to shipping said packages within a transportation system.

5. The computer system as recited in claim 2, wherein said central computer is said second computer.

6. The computer system as recited in claim 2, further comprising:
  a communication system for notifying consignees as to status of special handling of designated packages.

7. The communication system as recited in claim 6, further comprising:
  an alphanumeric pager.

8. The communication system as recited in claim 6, further comprising:
  a cellular telephone.

9. A method of handling multiple packages, comprising:
  receiving from a consignor multiple packages including a plurality of packages designated for special handling;
  receiving from said consignor package information describing said packages, said package information including whether a package is designated for special handling, the nature of special handling requested and a package destination location;
  creating from the information received from the consignor one or more pre-alert files containing for each of said designated packages a time of shipment, the destination location at which the package should receive special handling, and the identity of the consignor;
  storing said pre-alert files;
  providing access to said pre-alert files to said destination locations;
  receiving from the consignor said multiple packages;
  at a plurality of consolidation points, accessing one of the pre-alert files containing package information for packages whose destination is associated with the consolidation point;
  shipping said packages within a transportation system to said plurality of consolidation points at which said packages are selectively brought together;
  at each of said plurality of consolidation points, extracting from said one pre-alert file an identification of packages designated for special handling at the consolidation point;
  at each of said plurality of consolidation points, identifying said designated packages as they arrive at said consolidation points;
  at each of said plurality of consolidation points, prior to sortation of arriving packages, extracting said designated packages from a stream of packages arriving at the consolidation point;
  at each of said plurality of consolidation points, applying special handling to said extracted designated packages; and
  at each of said plurality of consolidation points, notifying one or more of a consignor and consignee of the application of special handling of said designated packages.

10. The method of claim 9, further comprising, at each of said plurality of consolidation points, noting a failure of one or more of said designated packages to arrive by a predetermined time; and notifying one or more of a consignor and a consignee of the failure.

11. The method of claim 9, wherein said pre-alert files include a time of shipment, the consolidation point at which special handling is to be applied, the identity of the consignee, and the identity of the consignor.

12. The method of handling multiple packages as recited in claim 9, further comprising the step of:
  monitoring how often there is a failure to apply special handling.

13. The method of handling multiple packages as recited in claim 12, further comprising the step of:
  generating an alert when there is a recurring failure to apply special handling.

14. The method of handling multiple packages as recited in claim 9, wherein said step of notifying a consignee comprises posting a notice on an accessible on-line site prior to delivery to the consignee.

15. The method of handling multiple packages as recited in claim 9, wherein said step of notifying a consignee comprises sending a notice to the consignee prior to delivery to the consignee.

16. The method of handling multiple packages as recited in claim 9, wherein said special handling includes holding each said designated package at a selected consolidation point for pick-up by said consignee.

17. The method of handling multiple packages as recited in claim 16, further comprising the step of monitoring how often there is a failure to apply special handling.

18. The method of handling multiple packages as recited in claim 9, wherein said package information is received from said consignor prior to shipping said packages within said transportation system.

19. The method of handling multiple packages as recited in claim 18, wherein said package information is consolidated from multiple messages received from said consignor.

20. The method of handling multiple packages as recited in claim 9, wherein said package information is sorted by consolidation point at a central location within said transportation system.

21. The method of handling multiple packages as recited in claim 9, wherein said package information is accessible to personnel stationed at said consolidation points prior to delivery to the consignee.

22. A method of providing repair parts to service representatives, comprising:
  receiving electronically from a consignor information relating to multiple packages being shipped by the consignor;
  said information designating a plurality of said packages to be held for pickup by one or more service representatives at one or more selected destination locations;
  creating from the information received from the consignor one or more pre-alert files containing for each of said designated packages a time of shipment, the selected location at which the package should be held, the identity of the service representative who will pick up the package, and the identity of the consignor;
  storing said pre-alert files;
  providing access to said pre-alert files to said destination locations;
  receiving from the consignor said multiple packages;
  shipping each of said packages within a transportation system via one or more sorting hubs to the selected destination location at which the package should be held;

monitoring incoming packages at said destination locations based on said pre-alert files;

identifying and, prior to sortation of said incoming packages, holding said designated packages at said selected destination location at which the package should be held;

updating said pre-alert files to reflect transportation and holding of said designated packages;

providing access to said pre-alert files to the consignor and the service representatives identified in the pre-alert files who will pick up the packages, and releasing each designated package to the service representative identified in the pre-alert files.

23. The method of claim 22, further comprising sending tracking information for each designated package to a tracking file when said designated packages pass through selected points in said transportation system.

24. The method of claim 23, further comprising providing access to said tracking file to the consignor and the person who will pick up the package.

25. A hold-for-pickup method of handling multiple packages, comprising:

receiving from a consignor via e-mail information relating to multiple packages being shipped by the consignor from a plurality of originating locations, said information designating a plurality of said packages to be held for pickup at a plurality of selected locations;

receiving from the consignor said multiple packages;

shipping said packages within a transportation system to a plurality of regions and within the regions to a plurality of consolidation points at which said packages are selectively brought together;

each of said selected locations being one of said consolidation points;

monitoring incoming packages at said destination locations based on said pre-alert files;

identifying and, prior to sortation of said incoming packages, holding said designated packages at said selected destination location at which the package should be held;

updating said pre-alert files to reflect transportation and holding of said designated packages;

providing access to said pre-alert files to the consignor and the service representatives identified in the pre-alert files who will pick up the packages, and releasing each designated package to the service representative identified in the pre-alert files.

26. A system for providing repair parts to service representatives, comprising:

a central computer configured to receive electronically from a consignor information relating to multiple packages containing repair parts being shipped by the consignor, said information designating a plurality of said packages to be held for pickup by one or more service representatives at one or more selected destination locations;

a tracking file; and an intranet linking said tracking file, said central computer, an accessible intranet site and a plurality of shipper terminals located at said selected destination locations;

said central computer being configured to create from the information received from the consignor and to store at said intranet site a plurality of pre-alert files containing for each of said designated packages a time of shipment, the selected destination location at which the package should be held, the identity of the service representative who will pick up the package, and the identity of the consignor;

a transportation system including:
said destination locations;
one or more sorting hubs; and
a plurality of package scanning devices positioned at said sorting hubs and destination locations and linked to said tracking file;

said packages being shipped via said transportation system to the selected destination location at which the package should be held;

one or more of said central computer and said shipper terminals being configured to update said pre-alert files responsive to tracking data received from said tracking file;

said shipper terminals being configured to access said pre-alert files;

said shipper terminals being configured to identify said designated packages responsive to one of said scanning devices detecting arrival of a designated package at its selected destination location and prior to sortation of arriving packages; and said shipper terminals being configured to update said pre-alert files with status information on arrival of a designated package at its selected destination location and on pickup of a designated package.

27. The system of claim 26, further comprising a consignor terminal linked to said intranet and configured to access said pre-alert files.

28. The system of claim 26, further comprising a consignee terminal linked to said intranet and configured to access said pre-alert files.

29. The system of claim 27, further comprising a consignee terminal linked to said intranet and configured to access said pre-alert files.

30. The system of claim 29, wherein said terminals are personal computers.

31. The system of claim 26, wherein said tracking file resides on the Internet; and wherein said central computer and said shipper terminals comprise an Internet interface.

32. The system of claim 26, further comprising a consignor computer linked to said central computer via a wide area network.

33. The system of claim 26, further comprising a consignor computer linked to said central computer via an e-mail link.

34. The system of claim 26, wherein said central computer is configured to send one or more status messages to the consignor containing said status information prior to a scheduled pick up time.

35. A method of handling multiple packages, comprising:

receiving from a consignor multiple packages including a plurality of packages designated for special handling;

receiving from said consignor package information describing said packages, said package information including whether a package is designated for special handling, the nature of special handling requested and the package destination;

storing said package information in pre-alert files sorted based on the package destination;

at a plurality of consolidation points, accessing one of the pre-alert files containing package information for packages whose destination is associated with the consolidation point;

shipping said packages within a transportation system to said plurality of consolidation points at which said packages are selectively brought together;

at each of said plurality of consolidation points, extracting from said one pre-alert file an identification of packages designated for special handling at the consolidation point;

at each of said plurality of consolidation points, identifying said designated packages as they arrive at said consolidation points;

at each of said plurality of consolidation points, extracting said designated packages from a stream of packages arriving at the consolidation point prior to sortation of said arriving packages;

at each of said plurality of consolidation points, applying special handling to said designated packages;

at each of said plurality of consolidation points, notifying one or more of a consignor and a consignee of the application of special handling of said designated packages;

monitoring how often there is a failure to apply special handling; and generating an alert when there is a recurring failure to apply special handling.

36. A computer system for monitoring packages designated for special handling and being shipped to a plurality of consolidation points, comprising:

a first computer with a processor configured to carry out instructions comprising the following steps:

compiling a list of designated packages requiring special handling; and sending said list electronically to a central computer;

an intranet linking said central computer, an accessible intranet site and a plurality of personal computers;

said central computer including a processor configured to carry out instructions comprising the following steps:

storing said list of designated packages requiring special handling;

sorting said list by consolidation point; and posting sorted information from said list to said intranet site;

said personal computers being located at each consolidation point with processors configured to carry out instructions comprising the following steps:

accessing said intranet site; and downloading information identifying said designated packages for said consolidation points; and a second computer configured to receive input data indicating for each designated package whether special handling has been applied and to then process said input data to determine how often there is a failure to apply special handling, and generate an alert signal when there is a recurring failure to apply special handling.

* * * * *

UNITED STATES PATENT AND TRADEMARK OFFICE
CERTIFICATE OF CORRECTION

PATENT NO. : 6,539,360 B1
DATED : March 25, 2003
INVENTOR(S) : Kadaba

It is certified that error appears in the above-identified patent and that said Letters Patent is hereby corrected as shown below:

Column 13,
Lines 36-49,

"monitoring incoming packages at said destination locations based on said pre-alert files;

identifying and, prior to sortation of said incoming packages, holding said designated packages at said selected destination location at which the package should be held;

updating said pre-alert files to reflect transportation and holding of said designated packages;

providing access to said pre-alert files to the consignor and the service representatives identified in the pre-alert files who will pick up the packages, and releasing each designated package to the service representative identified in the pre-alert files."

should read

--creating from the information received from the consignor and storing on an accessible intranet site a plurality of region-specific pre-alert files each containing for said designated packages addressed to a destination within a region a time of shipment, the selected location at which the package should be held, the identity of the person who will pick up the package, and the identity of the consignor;

providing access to said pre-alert files to said consolidation points;

tracking progress of said designated packages through the transportation system and storing tracking information in a tracking file;

UNITED STATES PATENT AND TRADEMARK OFFICE
CERTIFICATE OF CORRECTION

PATENT NO.   : 6,539,360 B1
DATED        : March 25, 2003
INVENTOR(S)  : Kadaba

It is certified that error appears in the above-identified patent and that said Letters Patent is hereby corrected as shown below:

<u>Column 13 (cont'd),</u>
    providing access to said tracking file to one or more of the consignor, a consignee, and the person who will pick up the package;
    monitoring incoming packages at said consolidation points based on said pre-alert files;
    identifying and, prior to sortation of said incoming packages, holding said designated packages at said selected consolidation points;
    updating said pre-alert files to reflect transportation and holding of said designated packages;
    providing access to said pre-alert files to one or more of the consignor, a consignee, and the person who will pick up the package, and
    releasing the designated packages to the persons identified in the pre-alert files.--.

Signed and Sealed this

Twenty-sixth Day of August, 2003

JAMES E. ROGAN
*Director of the United States Patent and Trademark Office*